J. LUDWIG.
DASHBOARD BRACKET.
APPLICATION FILED SEPT. 18, 1920.
1,410,688.
Patented Mar. 28, 1922.
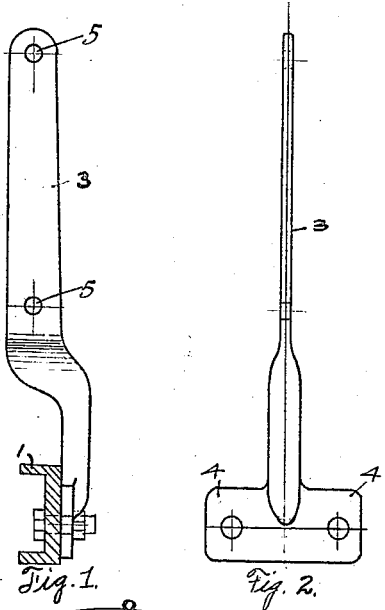
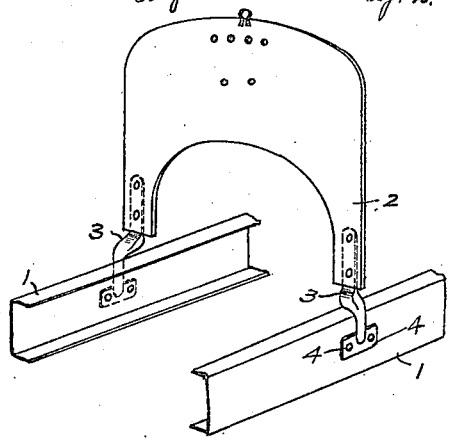
INVENTOR.
Joseph Ludwig.
BY
ATTORNEYS.

UNITED STATES PATENT OFFICE.

JOSEPH LUDWIG, OF HOUSTON, TEXAS.

DASHBOARD BRACKET.

1,410,688. Specification of Letters Patent. Patented Mar. 28, 1922.

Application filed September 18, 1920. Serial No. 411,094.

*To all whom it may concern:*

Be it known that I, JOSEPH LUDWIG, a citizen of the United States, residing at Houston, in the county of Harris and State of Texas, have invented certain new and useful Improvements in a Dashboard Bracket, of which the following is a specification.

This invention relates to new and useful improvements in a dash-board bracket.

One object of the invention is to provide a bracket of the character described which has been specially designed for use in securing the dash-board, of Ford cars, to the frame. In removing the motor of a Ford automobile, it is usually moved rearwardly, and as the dash-board brackets are now constructed they are too close together to permit the motor hangers to pass and consequently said brackets, and the dash-board, must be removed before removing the motor. The bracket herein described is so formed that it will permit the removal of the motor without removing the dash-board or its brackets.

Another object is to provide a bracket which is reversible, that is, which may be applied to either side of the automobile.

With the above and other objects in view, the invention has particular relation to certain novel features of construction and use, an example of which is given in this specification and illustrated in the accompanying drawings, wherein:—

Figure 1 shows a side view of the bracket.

Figure 2 is an edge view, and

Figure 3 shows a fragmentary perspective view of an automobile frame showing the dash-board secured thereto by my improved form of bracket.

Referring now more particularly to the drawings, wherein like numerals of reference designate similar parts in each of the figures, the numerals 1, 1 designate the side members of the automobile frame and the numeral 2 designates the dash-board which is secured, on each side, to the respective side members 1, by means of the brackets 3, 3. Each bracket is formed at its lower end, with the ears 4 through which securing bolts pass to secure the bracket to the outside of the corresponding side member 1. A short distance above said side member the bracket is curved inwardly and then extends up straight and said straight portion has suitable bolt holes 5 to receive the securing bolts by means of which the dash-board 2 is secured to the brackets. This dash-board is fastened to the rear sides of the brackets, and the brackets are formed so as to be interchangeable, that is, so that they may be applied to either side of the automobile.

In removing the motor it may be loosened from the frame and then moved rearwardly and the motor hangers will slide along the side members, between the brackets until the motor is in the rear of the dash-board and it then may be lifted out.

What I claim is:—

The combination of an automobile frame having side members, of a dash-board, end brackets whose lower ends are formed with lateral ears which fit against and are secured to the corresponding side members and to upper ends of which the corresponding ends of the dash-board are secured, said brackets being curved inwardly above the respective side members, and the upper ends being flattened transversely with respect to said ears.

In testimony whereof I have signed my name to this specification in the presence of two subscribing witnesses.

JOSEPH LUDWIG.

Witnesses:
U. E. HEBERT,
E. V. HARDWAY.